United States Patent [19]

Nakamura

[11] 4,090,410
[45] May 23, 1978

[54] PAPER FEEDING MECHANISM

[75] Inventor: Osamu Nakamura, Shioji, Japan

[73] Assignee: Shinshu Seiki Kabushiki Kaisha, Japan

[21] Appl. No.: 781,397

[22] Filed: Mar. 25, 1977

[30] Foreign Application Priority Data

Apr. 12, 1976  Japan .................................. 51-41037

[51] Int. Cl.² .......................... F16H 1/06; F16H 1/12; F16H 55/04; B65H 3/06
[52] U.S. Cl. .................................. 74/414; 74/421 R; 74/435; 271/109
[58] Field of Search ................. 74/414, 421 R, 412 R, 74/435, 437; 271/109

[56] References Cited

U.S. PATENT DOCUMENTS

| 1,536,799 | 5/1925 | Bombard et al. ................. 271/109 X |
| 1,671,687 | 5/1928 | Staude ................................... 271/109 |
| 2,149,014 | 2/1938 | Fritzsch ................................. 74/414 |
| 3,952,610 | 4/1976 | Hope et al. ........................ 74/421 R |

Primary Examiner—Leonard H. Gerin
Attorney, Agent, or Firm—Blum, Moscovitz, Friedman & Kaplan

[57] ABSTRACT

A paper-feeding mechanism of a compact printer is provided. The mechanism has a driven wheel which transmits rotation to a paper-feeding roller and a driving wheel which drives the driven wheel. The driving wheel has first and second sets of gear teeth for engagement with teeth on the driven wheel. The driving wheel is axially displaceable to provide for driving with the first set of gear teeth at a normal paper feed rate and also by the second set for driving at a rapid paper feed rate. A solenoid-operated rate-selection lever serves to select either of the driving speeds. A cam attached to a power wheel which drives the driving wheel serves to return the mechanism from rapid to regular paper-feeding.

18 Claims, 11 Drawing Figures

PAPER FEEDING MECHANISM

BACKGROUND OF THE INVENTION

This invention relates generally to a paper-feeding mechanism of a compact printer and especially to an intermittent paper-feeding mechanism. Conventional feeding mechanisms have employed plungers, cams and links, and clutches. Where rapid paper-feeding was required in a plunger-type feeding mechanism, several operative strokes of the plunger were necessary. This requirement has resulted in the use of a large-sized plunger with its consequent increased costs and current draw. Where clutches or cams and links are used, the construction is generally complicated and the driving sound is relatively high. Furthermore, as with plunger mechanisms, several operational cycles are needed for rapid paper-feeding, and the operational control circuits become complex. Furthermore, where several operational cycles are required the operating time is increased considerably.

SUMMARY OF THE INVENTION

Generally speaking, in accordance with the invention, a paper-feeding mechanism of a compact printer is provided. The mechanism has a driven wheel which transmits rotation to a paper-feeding roller and a driving wheel which drives the driven wheel. The driving wheel has first and second sets of gear teeth for engagement with teeth on the driven wheel. The driving wheel is axially displaceable to provide for driving with the first set of gear teeth at a normal paper feed rate and also by the second set for driving at a rapid paper feed rate. A solenoid-operated rate-selection lever serves to select either of the driving speeds. A cam attached to a power wheel which drives the driving wheel serves to return the mechanism from rapid to regular paper-feeding.

Accordingly, it is an object of this invention to provide a paper-feeding mechanism for a compact printer which feeds paper intermittently.

Another object of this invention is to provide a paper-feeding mechanism for a compact printer which has a regular paper-feeding rate and a rapid paper-feeding rate, with the rate-selection mechanism easily operable.

A further object of this invention is to provide a paper-feeding mechanism for a compact printer having a low noise level.

Still another object of this invention is to provide a paper-feeding mechanism for a compact printer that is easily and economically manufactured, assembled, repaired and is energy-efficient.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
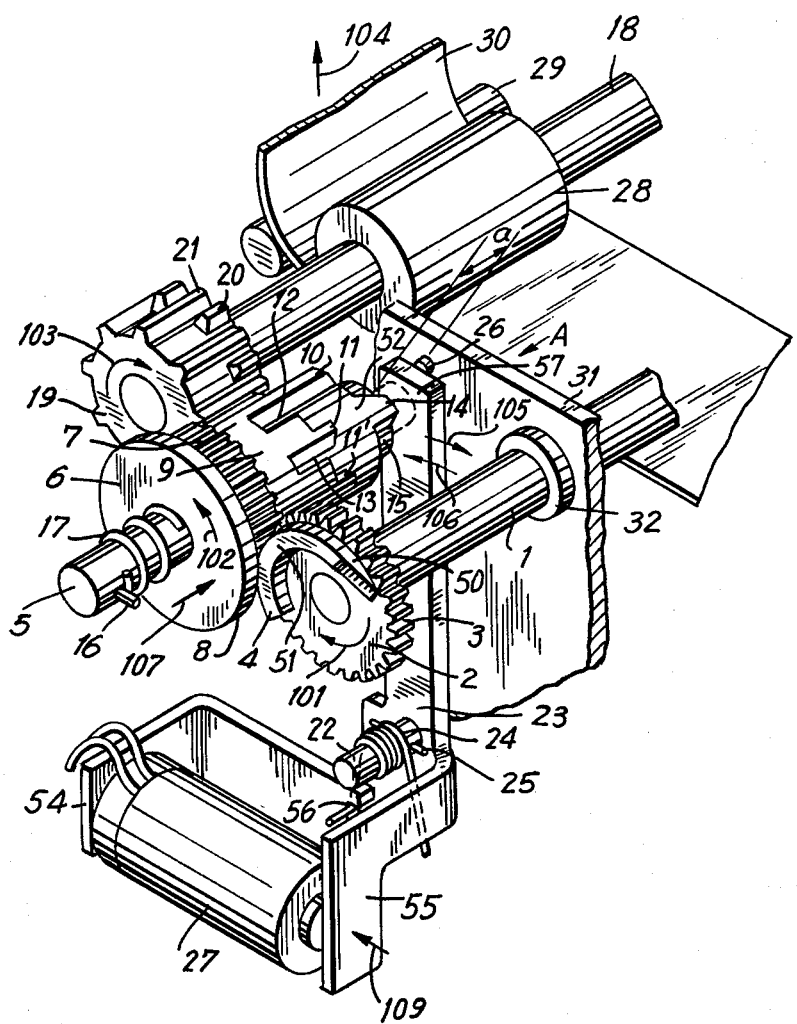
FIG. 1 is a perspective view of a paper-feeding mechanism for a compact printer constructed in accordance with a preferred embodiment of the instant invention, with the driven wheel in its stopped position.

Turning now to FIG. 1, a paper-feeding mechanism in accordance with the instant invention includes a frame 31 which has a bearing 32 for rotatably supporting a power shaft 1 which is rotatably driven in direction 101 by a motor (not shown) connected to one end of power shaft 1. The other end of power shaft 1 mounts a power wheel 2 having a toothed portion 3 and a semicircular return cam portion 4 disposed on its outer face. Cam portion 4 includes an inclined forward wall 50 which tapers from a narrowest point joining the outer face of power wheel 2 to a widest point joining a wall 51 which is parallel to and spaced from the outer face of power wheel 2.

Rotatably and slidably mounted to a shaft 5 is a driving wheel 6 which includes a toothed portion 7 for engagement with toothed portion 3 of power wheel 2 and a disk portion 8 which is of greater diameter than toothed portion 7 and which engages cam return portion 4 mounted to power wheel 2 for the axial displacement of driving wheel 6 as described below. Driving wheel 6 also includes a first cylindrical portion 52 and a second cylindrical portion 9 of a diameter greater than that of said first cylindrical portion 52 and positioned between said first cylindrical portion 52 and toothed portion 7. Extending from the periphery of second cylindrical portion 9 into first cylindrical portion 52 is a regular paper-feeding tooth 10 which extends to the far edge of first cylindrical portion 52. Located to the rear of tooth 10 as driving wheel 6 is rotated in the direction of arrow 102, and extending into second cylindrical portion 9, is a tooth recess portion 12 the base of which is an extension of first cylindrical surface 52. Also extending from the periphery of second cylindrical portion 9 are rapid paper-feeding teeth 11, 11' which are of shorter length than regular paper-feeding tooth 10 and have corresponding tooth recess portions 13, 13' located to the rear thereof and extending into second cylindrical portion 9 in the same manner as tooth recess portion 12. The end of first cylindrical portion 52 defines an annular differential or inclined cam 14 extending along a cylindrical bearing surface 15 of a diameter less than that of second cylindrical portion 9, as more particularly shown in FIG. 11.

Figure 9:
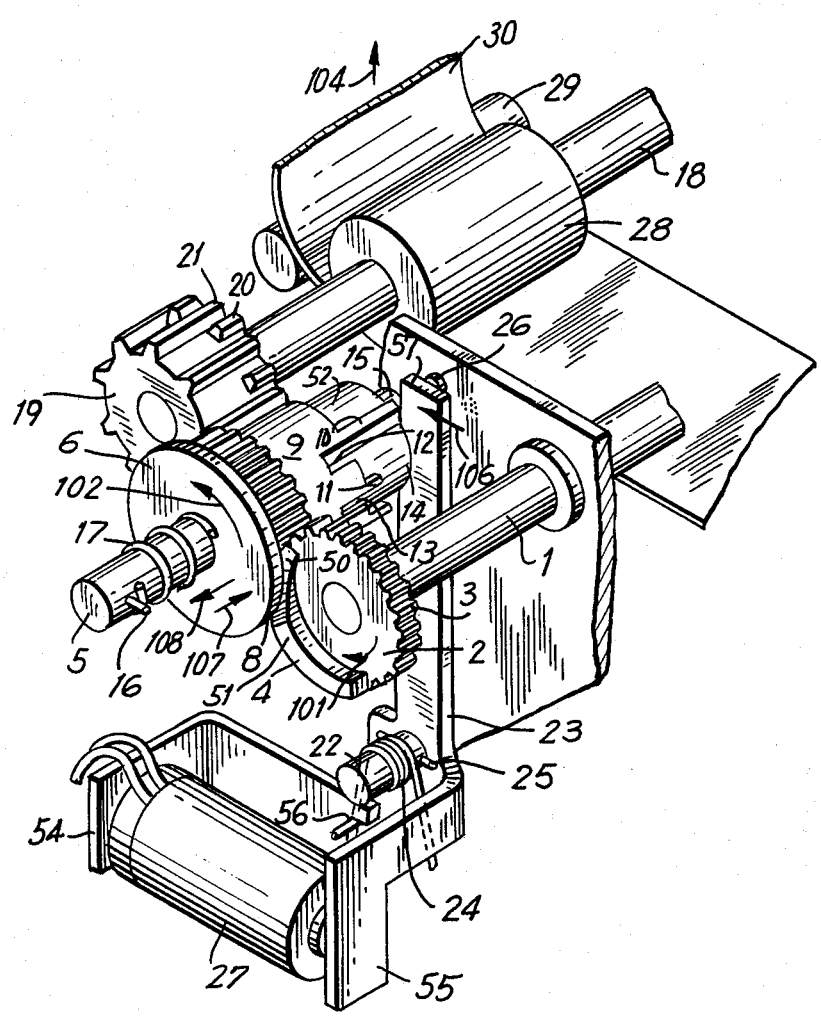
FIG. 9 is a perspective view of a paper-feeding mechanism constructed in accordance with the instant invention at the end of the rapid paper-feeding cycle.
Figure 10:
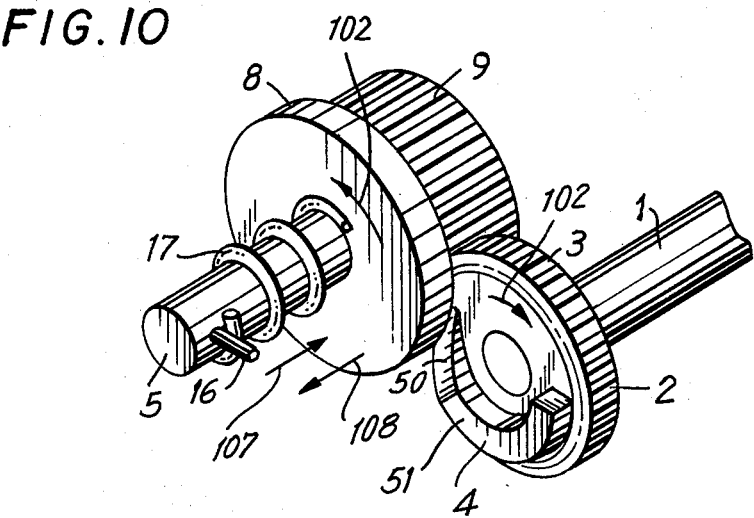
FIG. 10 is a perspective view of the mechanism controlling return of the driving wheel from the rapid to the regular feed cycles.

Driving wheel 6 is rotatable about shaft 5 in the direction of arrow 102 by means of the engagement of toothed portion 7 with the toothed portion 3 of power wheel 2 rotating in the direction of arrow 101. As shown in FIGS. 1 and 10, a pin 16 mounted to shaft 5 fixed one end of a coil spring 17, the other end of which abuts against disc portion 8 of driving of driving wheel 6 for biasing the driving wheel in the direction of arrow 107. As inclined forward wall 50 of cam portion 4 of power wheel 2 engages disk 8, it will axially displace driving wheel 6 in the direction of arrow 108 (FIGS. 9 and 10).

A rotating shaft 18 supports a driven wheel 19 which carries paper-feeding teeth 20 which extend partially across the longitudinal extent of its periphery and supplementary teeth 21 which extend across the full longitudinal extent of driven wheel 19's periphery and which alternate with paper-feeding teeth 20. Also mounted on shaft 18 is a paper-feeding roller 28, which, along with paper-holder roller 29, will displace displace a web of paper 30 in the direction of arrow 104 as driven wheel 19 is rotated in the direction if arrow 103 by means of driving wheel 6 rotating in the direction of arrow 102, as will hereinafter be described.

Figure 6:
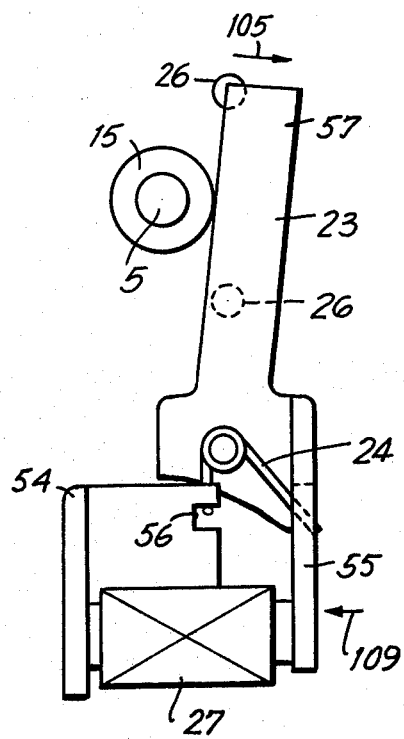
FIG. 6 is a schematic view of the feed-rate-selection-control mechanism.

The rate of paper feeding is controlled by rate-selection lever 23, which is pivotally mounted on a shaft 22. Rate-selection lever 23 is rotatable by means of a solenoid 27 mounted on a frame 54. The solenoid, when energized, attracts an extension 55 of rate-selection lever 23 in the direction of arrow 109 for causing rotation of rate-selection lever 23 in the direction of arrow 105 about shaft 22, as shown in FIG. 6. Rate-selection lever 23 is biased for rotation in the direction of arrow 106 by means of coil spring 24, one free end of which is located in notch 56 in frame 54, and the other free end of which abuts extension 55. Rate-selection lever 23 is positioned on shaft 22 by means of a pin 25 extending through shaft 22.

In the position depicted in FIG. 1, with solenoid 27 not energized, the biasing force of spring 24 will cause the upper end 57 of rate-selection lever 23 to be displaced in the direction of arrow 106 into a space "a" defined between cylindrical portion 15 of driven wheel 6 and a pair of projections 26 extending from frame 31. In this position, upper end 57 of rate-selection lever 23 engages against shaft 5. The space "a" is larger than the thickness of portion 57 of rate-selection lever 23, so that the lever may be easily reciprocated in and out of space "a".

Figure 2:
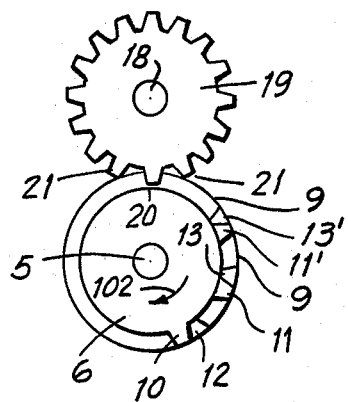
FIG. 2 is an elevational view taken from direction A in FIG. 1 showing the driving and driven wheels.

FIG. 2 is a view taken from the direction A in FIG. 1 when paper-feeding roller 28 is in a stopped position. In such stopped position, a pair of supplementary teeth 21 abut and lightly contact the outer periphery of second cylindrical portion 9 of driving wheel 6. As this occurs, driven wheel 19 is prevented from rotating, which in turn prevents paper feeding roller 28 from rotating. Once during each rotation of driving wheel 6, regular paper-feeding tooth 10 engages a paper feeding tooth 20 to advance driven wheel 19 and paper feeding roller 28 an angular distance determined by the spacing between supplementary teeth 21. One supplementary tooth 21 is received in tooth recess portion 12 to permit such advance. In this manner, the printing paper 30 is intermittently advanced at uniform intervals in a highly accurate manner.

Figure 4:
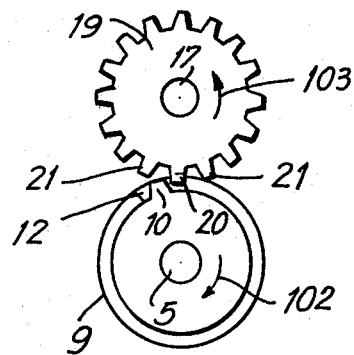
FIG. 4 is an elevational view taken from direction B in FIG. 3 showing the driving and driven wheels.
Figure 3:
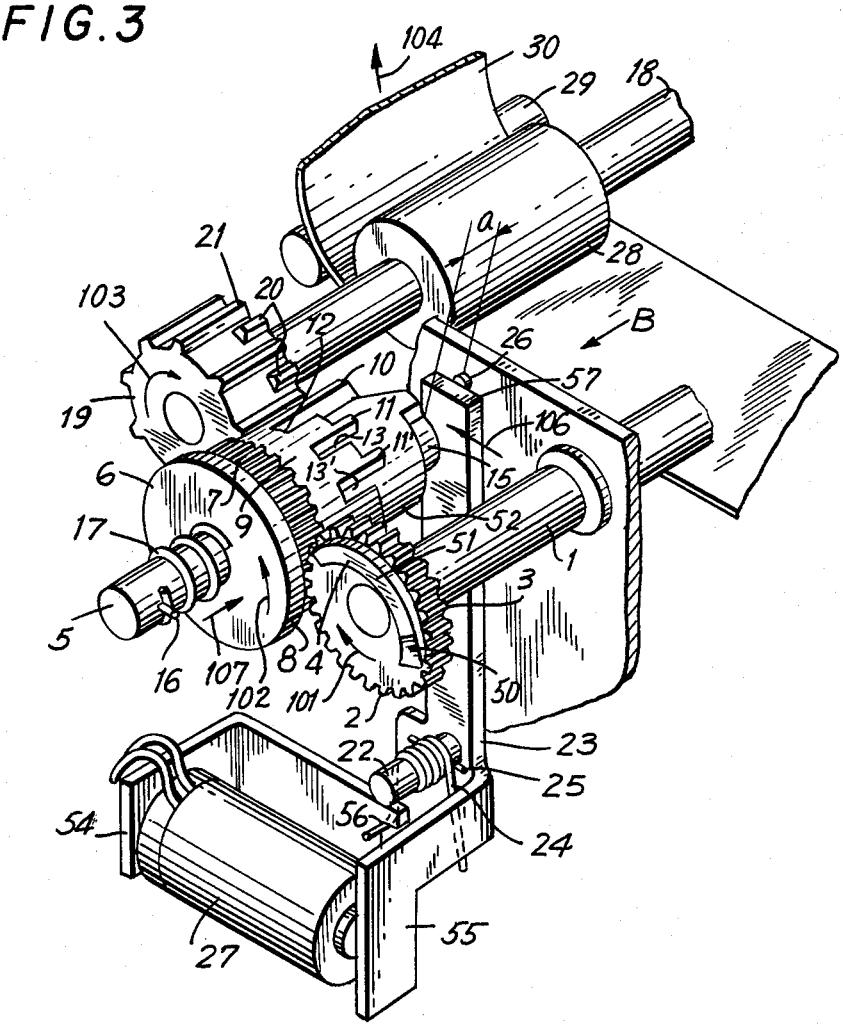
FIG. 3 is a perspective view of a paper-feeding mechanism constructed in accordance with the instant invention at the beginning of the regular paper-feeding cycle.
Figure 5:
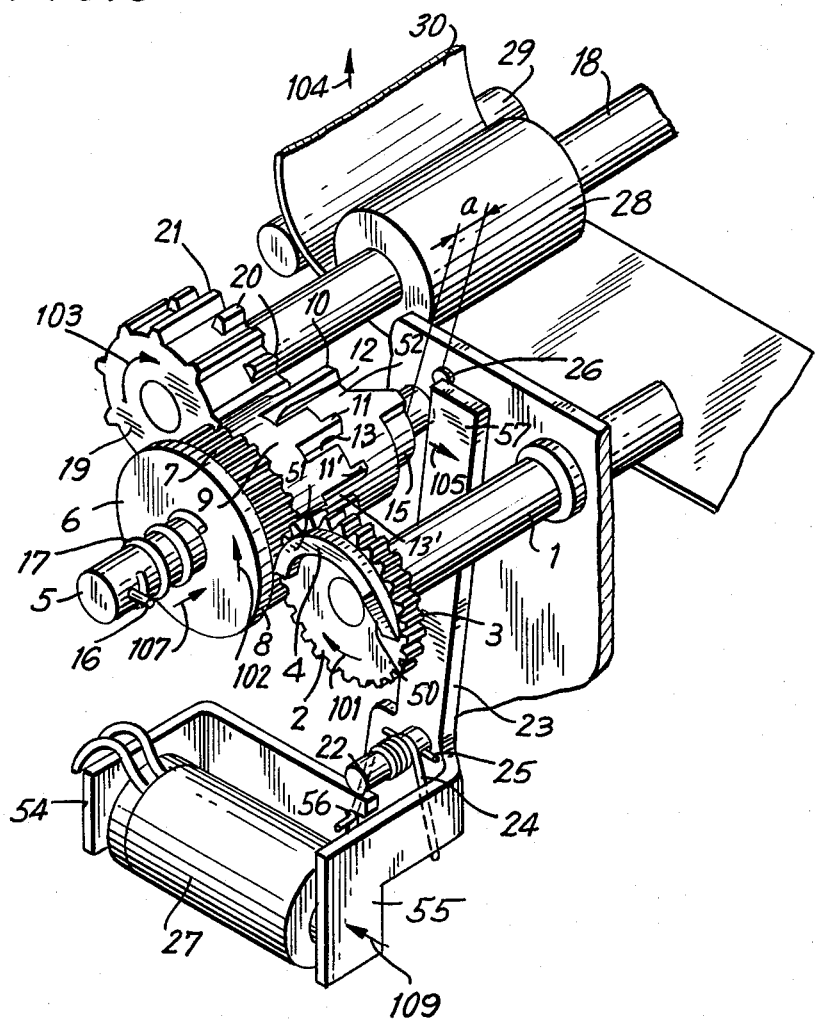
FIG. 5 is a perspective view of a paper-feeding mechanism constructed in accordance with the instant invention at the beginning of the rapid paper-feeding cycle.

FIG. 3 is an operational view of the paper-feeding mechanism at the beginning of its regular feeding mode. In this mode, solenoid 27 is de-energized and thus rate-selection lever 23 is biased in the direction of arrow 106 by means of spring 24 and is inserted into space "a" in contact with shaft 5. As noted above, the biasing force of spring 17 on driving wheel 6 engages upper section 57 of rate-selection lever 23 against projections 26 mounted on frame 31. In this position, disk 8 of driving wheel 6 will be disengaged from contact with cam portion 4 of power wheel 2 at all rotary positions thereof. However, gear portion 3 of power wheel 2 and gear portion 7 of driving wheel 6 will remain engaged for transmission of rotational movement to driving wheel 6 in the direction of arrow 102. In this position, a pair of supplementary teeth 21 will abut and slide along the outer periphery of second cylindrical portion 9 of driven wheel 6 except when regular paper-feeding tooth 10 on driven wheel 6 contacts a paper-feeding tooth on driven wheel 19, as shown in FIG. 4.

As regular paper-feeding tooth 10 approaches paper-feeding tooth 20, they will engage and index driven wheel 19 in the direction of arrow 103. Simultaneously, a supplementary tooth 21 will engage tooth recess portion 12 in second cylindrical portion 9 to allow movement in the direction of said arrow 103. After such rotation, a pair of supplementary teeth 21 will again contact the outer periphery of cam portion 9 to lock driven wheel 19 in position until regular paper-feeding tooth 10 engages the next paper-feeding tooth 20.

Figure 7:
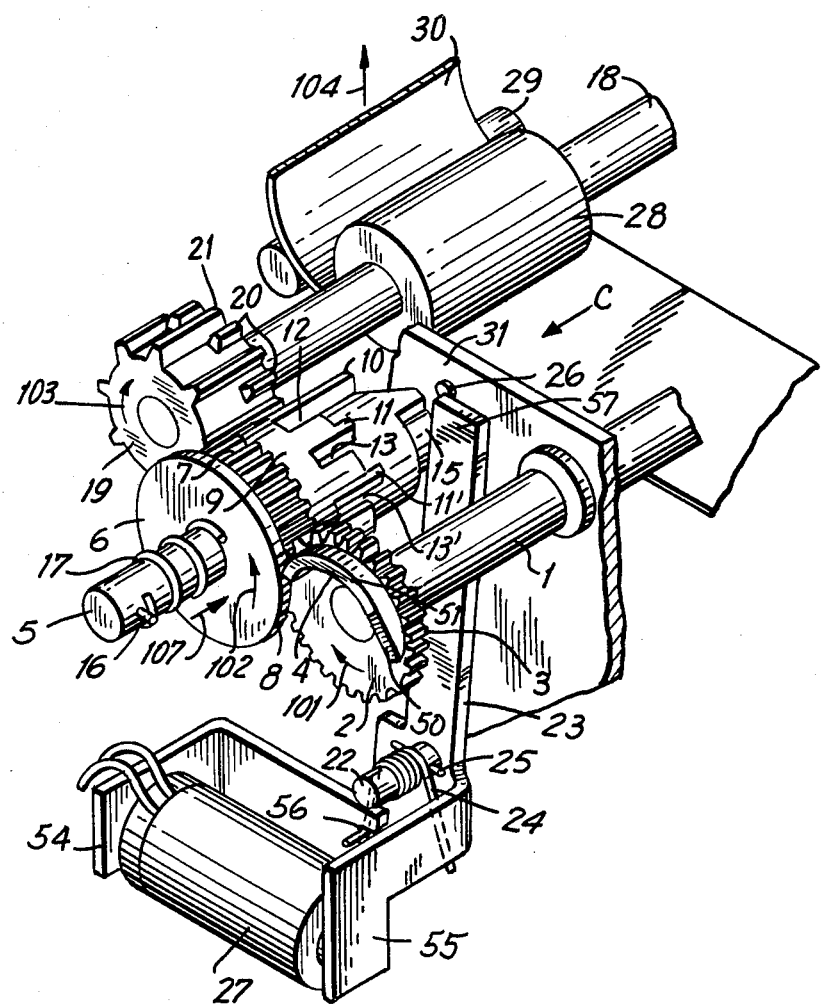
FIG. 7 is a perspective view of a paper-feeding mechanism constructed in accordance with the instant invention during the rapid paper-feeding cycle.

FIGS. 5 through 8 illustrate the paper-feeding mechanism in its rapid-feed mode. In order to activate the rapid paper-feed mode, solenoid 27 is energized, which causes extension 55 of rate-selection lever 23 to be displaced in the direction of arrow 109, which causes rotation of lever 23 about shaft 22 and displaces portion 57 in the direction of arrow 105 away from driving wheel 6. As this occurs, and when cam portion 4 on power wheel 2 is in such an angular position as to be disengaged from disk 8 of driving wheel 6, driving wheel 6 will be displaced in the direction of arrow 107 by means of spring 17, so that the end of cylindrical portion 15 will contact frame 31, as shown in FIGS. 6 and 7. This will position driving wheel 6 with respect to driven wheel 19 so that the rapid paper-feeding teeth 11, 11' as well as regular paper-feeding tooth 10, are engageable with teeth 20 on driven wheel 19.

Figure 8:
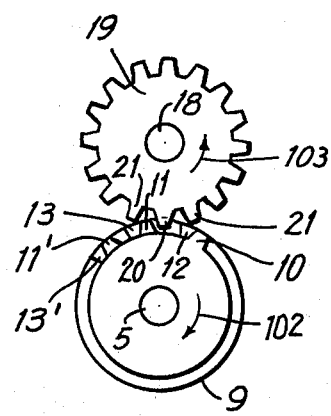
FIG. 8 is an elevational view taken from direction C in FIG. 7 showing the driving and driven wheels.

As shown in FIG. 8, tooth 10 on driving wheel 6 will engage paper-feeding tooth 20 and displace it in the direction of arrow 103, with supplementary tooth 21 engaging with tooth recess portion 12. The first rapid paper-feeding tooth 11 will then engage the next tooth 20 and further displace driven wheel 19 in direction 103 while the next supplementary tooth 21 is engaged with tooth recess portion 13. Subsequently, the second rapid-feeding tooth 11' will engage the next paper-feeding tooth 20 and the next supplementary tooth 21 will be engaged by the next tooth recess portion 13'. Thus, in this quick-feeding mode, driven wheel 19 will be indexed once by the regular tooth 10 and once each by the two rapid-feeding teeth 11, 11'. This will cause paper 30 to be displaced an amount equal to three times the amount displaced in the regular paper-feeding mode. After quick-feeding tooth 11' moves away from engagement with the third paper-feeding tooth 20, the abutment of a pair of supplementary teeth 21 on the outer periphery of second cylindrical surface 9 will lock driven wheel 19 against rotation until the next cycle begins.

Figure 11:
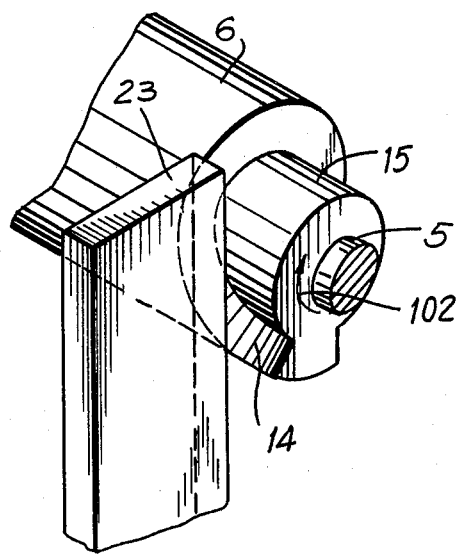
FIG. 11 is a partial perspective view of the feed-rate-selection lever in engagement with the differential cam of the driving wheel.

FIGS. 9 through 11 illustrate the mode change from rapid paper-feeding to regular paper-feeding. Solenoid 27 is de-energized, which causes lever 20 to rotate about shaft 22 in the direction of arrow 105, causing portion 57 to contact driving wheel 6 at cylindrical portion 15 thereof. As power wheel 2 rotates, as shown in FIG. 10, forward inclined wall 50 of return cam portion 4 will engage disk 8 of driving wheel 6 and will thrust the entire driving wheel 6 in the direction of arrow 108 against the bias of spring 17, which will again open the space "a" between cylindrical portion 15 of driving wheel 6 and projection 26 on frame 31. At approximately the same time as the start of the engagement of driving wheel 6 by return cam 5, as shown in FIG. 11, the axial displacement of driven wheel 6 is aided by the riding of differential cam 14 on portion 57 of lever 23 until lever 23 is free to pivot in the direction of arrow 106 into space "a" and engagement with shaft 5. Such pivoting of lever 23 results from the bias of spring 24. This completes the mode change back to the position of FIG. 1, and in this position, only regular paper-feeding tooth 10 is engageable with paper-feeding tooth 20 on driven wheel 19.

In summary, regular paper-feeding is accomplished by the engagement of regular paper-feeding tooth 10 of driving wheel 6 with paper-feeding teeth 20 on driven wheel 19. High-speed feeding of paper is accomplished by actuating solenoid 27 to pivot end 57 of lever 23 away from driving wheel 6 to allow driving wheel 6 to be axially displaced in the direction of arrow 107 by spring 17, so as to cause supplementary teeth 11 to engage paper-feeding teeth 20 so as to change the drive-rotation ratio of driven wheel 19 and driving wheel 6. The solenoid-actuated drive rate-selection lever provides a simple means for changing mode. Furthermore, the tooth arrangement of driving wheel 6 and driven wheel 19 provides for low noise, high accuracy, easy assembly, compact size, efficiency and lower costs.

It is to be noted that while the above description illustrates a single regular paper-feeding tooth 10, a pair of rapid paper-feeding teeth 11, a second cylindrical surface portion 9 for locking driven wheel 19, and the alternate arrangement of supplementary teeth on driven wheel 19, the number of teeth, teeth configurations and cam means may be altered without departing from the spirit and scope of the invention. Furthermore, while a coil spring is used to bias driving wheel 6 in the thrust direction, many other biasing means could be substituted therefor. Still further, while a return cam portion 4 is illustrated, any other equivalent method could be used to return the driving wheel to its original position. Finally, while a solenoid-actuated rate-selection lever is used, any other means for positioning the driving wheel at various positions could be substituted therefor, and the above descriptions are not to be construed as limiting in any sense the invention to those means described.

It will thus be seen that the objects set forth above, among those made apparent from the preceding description, are efficiently attained, and since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A paper-feeding mechanism for a compact printer comprising paper-feeding roller means, a driven wheel for transmitting rotary motion to said roller means, a driving wheel driving said driven wheel, said driven wheel having first and second rotary motion transmission means, said driving means having means for cooperative interengagement with said first and second transmission means, said first and second transmission means being adapted to drive said driven wheel at different rotary speeds when engaged by said interengagement means, and means for selectively engaging said interengagement means with one of said first and second transmission means for selecting the rotary drive speed of said driven wheel.

2. A paper-feeding mechanism as claimed in claim 1, wherein said first and second transmission means and said means for cooperative interengagement with said first and second transmission means comprises gear teeth mounted respectively on said driven and said driving wheels.

3. A paper-feeding mechanism as claimed in claim 1, wherein said selective engagement means comprises means for displacing one of said driving and said driven wheels along its respective rotary axis for selective engagement of one of said first and second transmission means with said interengagement means.

4. A paper-feeding mechanism as claimed in claim 3, wherein said selective engagement means includes means for returning said one of said driving and said driven wheels to its initial position after displacement along its axis of rotation.

5. A paper-feeding mechanism as claimed in claim 4, wherein said return means comprises cam means.

6. A paper-feeding mechanism as claimed in claim 3, wherein said displacing means includes means biasing said one of said driving and said driven wheels in one direction along its respective rotary axis.

7. A paper-feeding mechanism as claimed in claim 6, wherein said biasing means is an elastic member.

8. A paper-feeding mechanism as claimed in claim 6, wherein said selective engagement means includes displaceable stop means selectively positionable in the path of displacement of said one of said driving and said driven wheels to position said first transmission means in registration with said interengagement means, means selectively displacing said stop means out of said path to permit axial displacement of said one of said driving and said driven wheels in response to said biasing means to position said second transmission means in registration with said interengaging means, and return means for axially returning said one of said driving and said driven wheels to said first-mentioned position at which said stop means is once again positioned in said path.

9. A paper-feeding mechanism as claimed in claim 8, wherein said return means is a cam means.

10. A paper-feeding mechanism as claimed in claim 9, wherein said cam means includes at least in part a cam formed on a periphery of said one of said driving and said driven means for application with said stop means.

11. A paper-feeding mechanism as claimed in claim 8, wherein said driving wheel is displaced.

12. A paper-feeding mechanism as claimed in claim 11, including a rotatable power wheel coupled to said driving wheel for transmitting a rotation thereto, said cam means including at least a cam surface on one of said power and said driving wheels and a cam follower cooperating with said cam surface on the other of said power and said driving wheels.

13. A paper-feeding mechanism as claimed in claim 8, wherein said first and second transmission means comprise at least two side by side sets of gear teeth on the periphery of said driven wheel, the first of said sets of gear teeth on said driven wheel having a pitch equal to a multiple of the pitch of the second of said sets of teeth.

14. A paper-feeding mechanism as claimed in claim 8, wherein said means for selectively displacing said stop means is a solenoid.

15. A paper-feeding mechanism as recited in claim 14, wherein said interengaging means includes a camming surface in the periphery of said driving wheel, at least one regular feed tooth on the periphery of said driving wheel and projecting axially from said camming surface, at least one rapid feed tooth on the periphery of said driving wheel and projecting axially from said camming surface a distance less than said at least one regular tooth, said camming surface being formed with grooves thereon in registration with the rear, as viewed in the direction of rotation of the driving wheel of said regular and rapid feed teeth, and grooves being spaced a distance substantially equal to the pitch of said first set of gear teeth and dimensioned so that at said first-mentioned position of said one of said driving and said driven wheels, said regular feed tooth engages one of said teeth of said second set of teeth to advance the driven wheel by a distance substantially equal to the pitch of said first set, two of said teeth of said first set of teeth thereafter riding on said camming surface of said rotating driving wheel to hold said driven wheel stationary, at said second position, each of said regular and said rapid-feed teeth engaging a corresponding number of teeth of said second set to advance said driven wheel a distance substantially equal to the number of regular and rapid-feed teeth times the pitch of said first set, the teeth of said first set riding on said grooves during such advance and thereafter, two of the teeth of said first set riding on said camming surface.

16. A paper-feeding mechanism as claimed in claim 15, wherein said teeth of said first set are extensions of spaces of the teeth of said second set.

17. A paper-feeding mechanism as claimed in claim 1, wherein said selective engagement means comprises means for displacing one of said driving and said driven wheels along its respective rotary axis from a first position in engagement with said first transmission means to a second position in engagement with said second transmission means, said interengaging means including a camming surface in the periphery of said driving wheel, at least one regular feed tooth on the periphery of said driving wheel and projecting axially from said camming surface, said regular feed tooth forming said first transmission means, at least one rapid feed tooth on the periphery of said driving wheel and projecting axially from said camming surface a distance less than said at least one regular tooth, said rapid feed tooth forming said second transmission means, said camming surface being formed with grooves thereon in registration with the rear, as viewed in the direction of the driving wheel of said regular and rapid feed teeth, and grooves being spaced a distance substantially equal to the pitch of said first set of gear teeth and dimensioned so that at said first mentioned position of said one of said driving and said driven wheels said regular feed tooth engages one of said teeth of said second set of teeth to advance the driven wheel by a distance substantially equal to the pitch of said first set, two of said teeth of said first set of teeth thereafter riding on said camming surface of said rotating driving wheel to hold said driven wheel stationary, at said second position, each of said regular and said rapid feed teeth engaging a corresponding number of teeth of said second set to advance said driven wheel a distance substantially equal to the number of regular and rapid feed teeth times the pitch of said first set, the teeth of said first set riding on said grooves during such advance and thereafter, two of the teeth of said first set riding on said camming surface.

18. A paper feeding mechanism as claimed in claim 16, wherein said driving wheel is displaced.

* * * * *